(12) United States Patent
Ertel et al.

(10) Patent No.: US 6,971,509 B2
(45) Date of Patent: Dec. 6, 2005

(54) ENDLESS BELT CONVEYOR FRAME AND TENSIONING DEVICE INCLUDING CENTER DRIVE CONSTRUCTION

(75) Inventors: Daniel E. Ertel, Oconomowoc, WI (US); Scott M. Hall, Sussex, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 11/072,672

(22) Filed: Mar. 4, 2005

(65) Prior Publication Data

US 2005/0145465 A1   Jul. 7, 2005

Related U.S. Application Data

(62) Division of application No. 10/385,906, filed on Mar. 11, 2003, now Pat. No. 6,871,737.

(60) Provisional application No. 60/368,957, filed on Mar. 29, 2002.

(51) Int. Cl.$^7$ ............................................. B65G 23/44
(52) U.S. Cl. ..................................... 198/813; 198/835
(58) Field of Search .............................. 198/813–816, 198/835

(56) References Cited

U.S. PATENT DOCUMENTS

| | | | | |
|---|---|---|---|---|
| 3,291,287 A | * | 12/1966 | Rehm ........................ | 198/570 |
| 3,536,185 A | * | 10/1970 | Beck ........................ | 198/815 |
| 5,156,260 A | | 10/1992 | Dorner et al. | |
| 5,156,261 A | | 10/1992 | Dorner | |
| 5,174,435 A | | 12/1992 | Dorner et al. | |
| 5,203,447 A | | 4/1993 | Ewert | |
| 5,265,714 A | | 11/1993 | Hansen | |
| 6,109,427 A | | 8/2000 | Hosch et al. | |
| 6,298,981 B1 | | 10/2001 | Hosch et al. | |
| 6,422,382 B1 | | 7/2002 | Ertel et al. | |
| 6,685,010 B2 | * | 2/2004 | Warnecke ................... | 198/814 |
| 6,708,817 B2 | * | 3/2004 | Klabisch et al. ............ | 198/813 |
| 6,843,365 B2 | * | 1/2005 | Baker ........................ | 198/813 |

* cited by examiner

Primary Examiner—Gene O. Crawford
Assistant Examiner—Mark A. Deuble
(74) Attorney, Agent, or Firm—Andrus, Sceales, Starke & Sawall, LLP

(57) ABSTRACT

A conveyor construction that includes a conveyor frame assembly formed from a pair of spaced side frame members interconnected with each other by spaced cross members. The upper bed of the conveyor frame assembly is formed from individual bed plate strips attached to each of the cross members. The width of the conveyor frame assembly can be modified by the proper selection of the number of bed plate strips. The conveyor frame assembly includes a separate tensioning assembly and tracking adjustment assembly. The tracking adjustment assembly is adjusted separate from the tensioning assembly such that additional tension applied to the conveyor belt does not affect the previously selected tracking adjustment. The conveyor construction includes a center drive unit having only a single drive roller, a guide roller and a tensioning roller. The tensioning roller position is controlled by a pair of spaced tensioning cylinder.

15 Claims, 12 Drawing Sheets

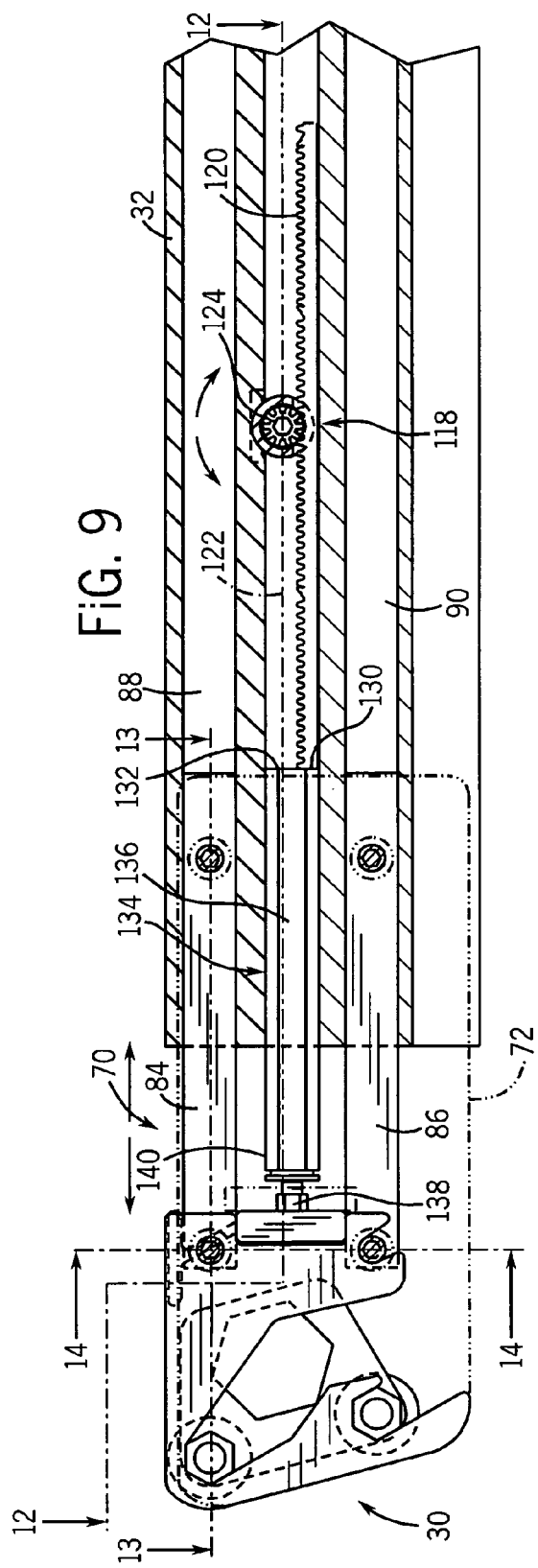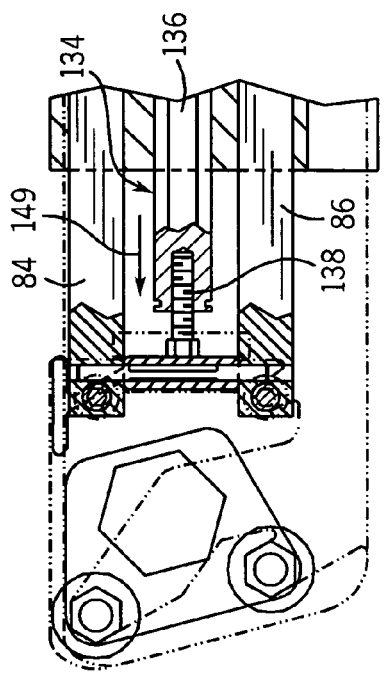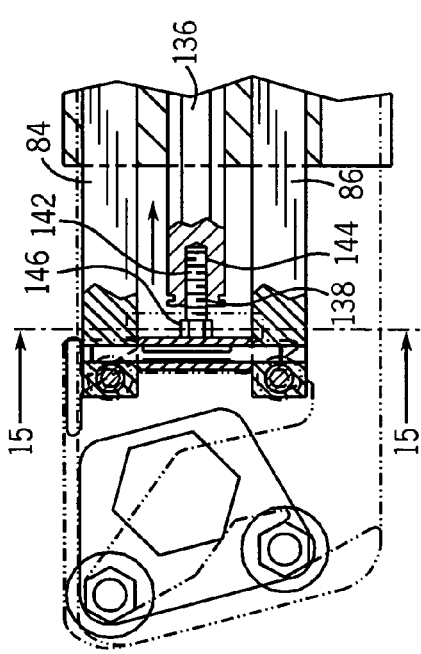

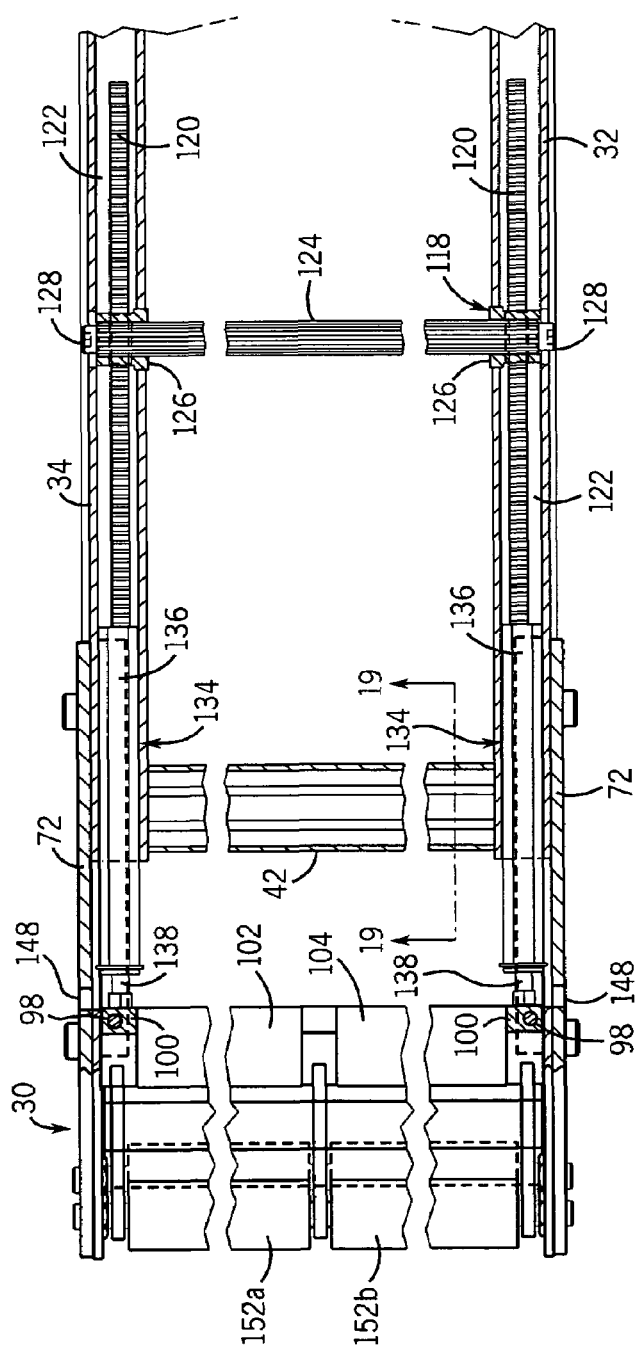
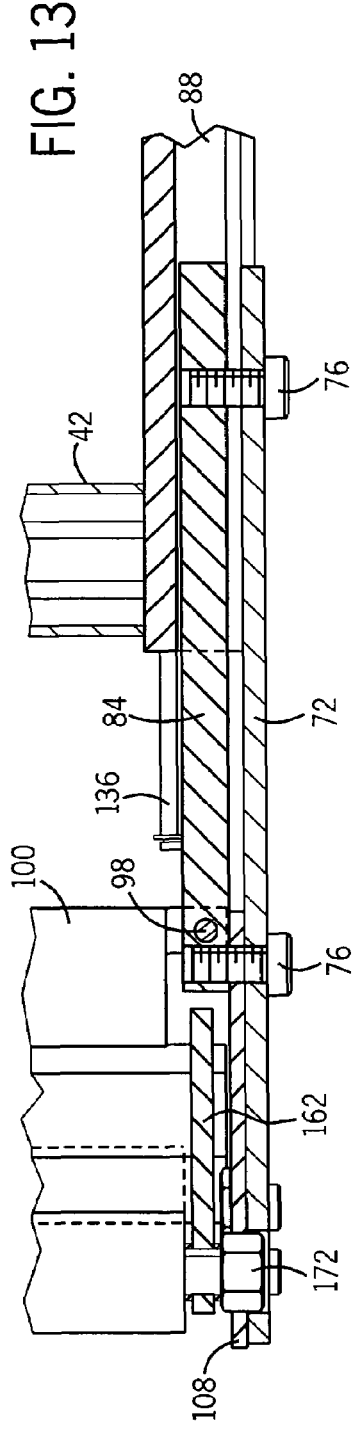
FIG. 12
FIG. 13

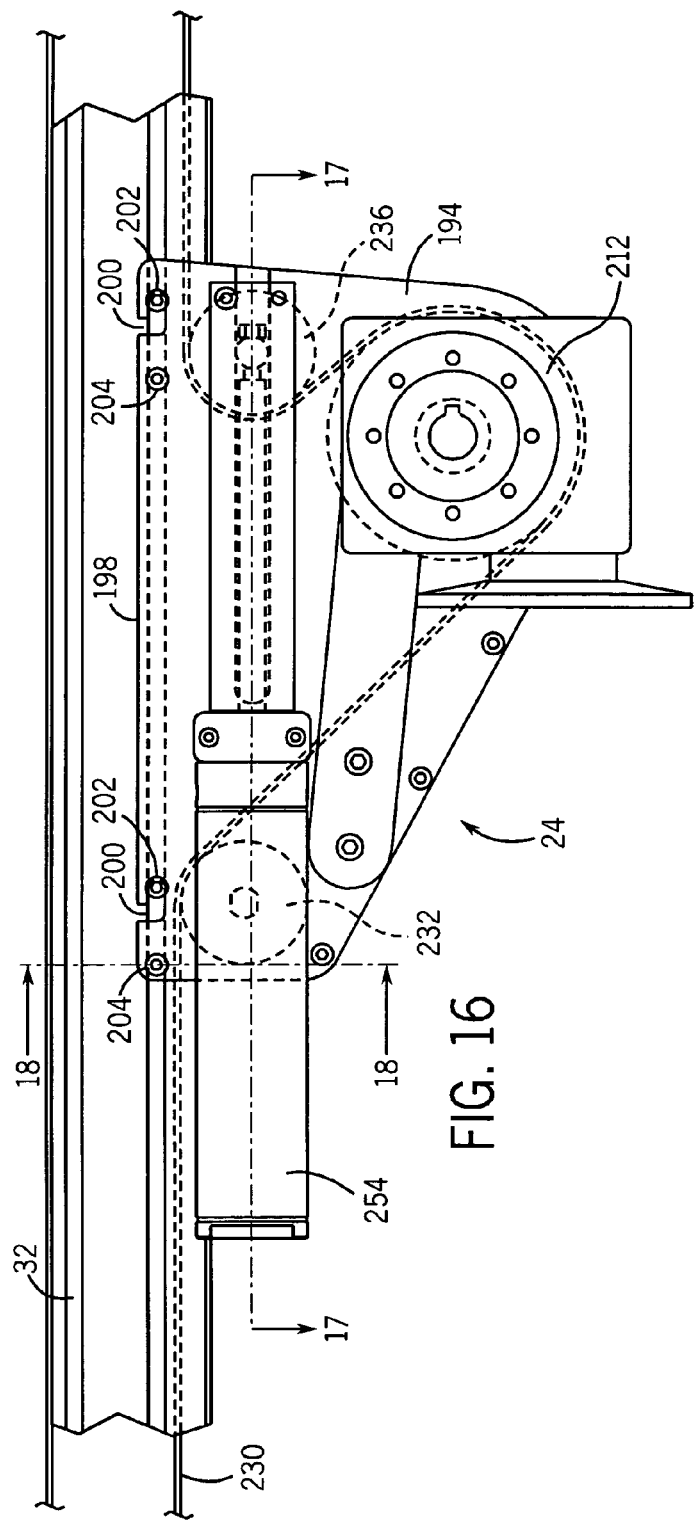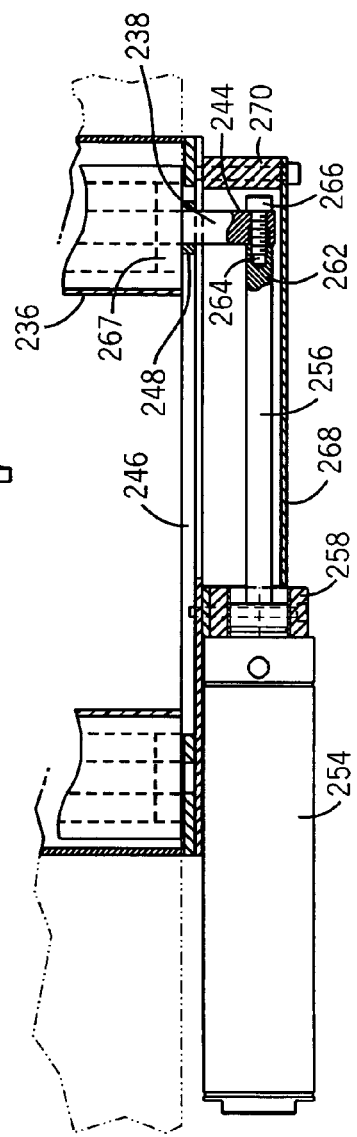
FIG. 16
FIG. 17

ENDLESS BELT CONVEYOR FRAME AND TENSIONING DEVICE INCLUDING CENTER DRIVE CONSTRUCTION

CROSS-REFERENCE TO RELATED APPLICATION

The present invention is a divisional filing based on U.S. patent application Ser. No. 10/385,906, filed on Mar. 11, 2003, now U.S. Pat. No. 6,871,737, which is based on and claims priority to U.S. Provisional Patent Application Ser. No. 60/368,957, filed on Mar. 29, 2002.

BACKGROUND OF THE INVENTION

The present invention generally relates to endless belt conveyors. More specifically, the present invention relates to an endless belt conveyor having a modular frame, an improved tension and tracking mechanism and a center drive construction that increases the ease with which the conveyor belt can be removed and replaced.

Known constructions of an endless belt conveyor typically includes a frame assembly, a pair of head plates located at each end of the frame assembly, a spindle extending between each pair of head plates, and a conveyor belt engaged between the spindles. One of the spindles is drivingly interconnected with a motor for rotating the spindle to impart movement to the endless conveyor belt. The drive motor can be positioned at either end of the conveyor assembly, or can be center mounted depending upon space constraints.

The head plates utilized in known conveyor constructions are movably mounted to the frame assembly so as to provide selective adjustment of the position of the spindles for providing proper belt tensioning and tracking. One such construction is illustrated in Dorner et al. U.S. Pat. No. 5,174,435, the disclosure of which is incorporated herein by reference.

In the Dorner et al. '435 patent, the conveyor frame is a ladder-type construction consisting of a pair of side frame members interconnected via a series of transversely extending cross members, each of which is connected at its ends to the side frame member. The top of the conveyor is formed by a single, continuous bed plate that is mounted on the cross members and supports the upper run of the endless conveyor belt. T-shaped slots are formed in the side frame members and each head plate is movably mounted to one of the side frame members by means of a T-nut slidably received within the T-shaped slot. A rack and pinion subassembly is mounted adjacent each end of the frame assembly for selectively moving the head plates outward and inward relative to the frame assembly. A cam-type tracking mechanism is interconnected with the rack and pinion subassembly and provides adjustability in the angle of the spindle relative to the conveyor frame for providing proper belt tracking.

Although the conveyor illustrated in the '435 patent is able to adjust belt tension and provide for belt tracking, the cam-type tracking mechanism is interrelated with the tensioning system such that if the belt needs to be retensioned, the belt tracking mechanism is released and needs to be subsequently readjusted. This drawback requires additional set-up time each time the belt needs to be retensioned, which is a clear drawback in the conveyor system.

Another conveyor construction is illustrated in the Hosch et al. U.S. Pat. No. 6,109,427, the disclosure of which is incorporated herein by reference. In the Hosch et al. '427 patent, the top wall of the conveyor includes a central groove that receives a corresponding center rib on the inner surface of the conveyor belt. The interaction between groove and belt provides tracking for the conveyor belt over its continuous length. However, in this configuration, the top plate of the conveyor frame is a single component that must be specifically sized for the conveyor. Thus, the conveyor widths are limited due to the top plate configuration.

The Hosch et al. '427 patent further teaches a rack and pinion subassembly used to provide tensioning for the conveyor belt. The rack and pinion subassembly includes a locking handle that secures the location of the head plate once proper belt tension has been achieved. While this type of construction has been found to be highly satisfactory, it suffers several drawbacks, including the inability to provide belt tracking and the requirement of a conveyor belt having a center rib that is received within the groove formed in the top plate.

Typically, the endless belt of a conveyor is driven either by an end drive unit positioned to drive a spindle located at either end of the conveyor frame or a center drive unit positioned along the length of the conveyor frame and mounted beneath the conveyor frame. In a center drive unit, the continuous belt is wound through a series of rollers, including a drive roller and a tensioning roller, to impart the required motive force to the conveyor belt. One such center drive unit is illustrated in Ewert U.S. Pat. No. 5,203,447, the disclosure of which is incorporated herein by reference. As can be understood in the Ewert '447 patent, the endless belt is entrained around six separate rollers positioned in a tortured path beneath the conveyor frame. The tortured path increases the driving traction on the belt due to the degree of wrap of the belt around the drive spindle and other drive members.

Although the center drive unit illustrated in the '447 patent is efficient for driving the conveyor belt, threading the conveyor belt through the center drive unit is a tedious and time-consuming task. Further, the multiple spindles require additional parts and manufacturing costs to produce.

Therefore, it is an object of the present invention to provide an endless belt conveyor construction that replaces prior frame construction with a modular top platform that lends itself to increased flexibility in manufacturing conveyors of various lengths and widths. It is a further object of the present invention to provide a conveyor frame construction in which the various components can be incorporated in a low profile arrangement without sacrificing strength of the conveyor frame while maintaining optimal belt tensioning and tracking capabilities. A still further object of the invention is to provide a conveyor construction that includes a separate subassembly for rack and pinion type belt tensioning and the belt tracking that allows the belt tensioning to be adjusted without affecting the belt tracking. A still further object of the invention is to provide a conveyor construction having a tracking mechanism that can be adjusted through the head plates of the conveyor to provide proper alignment for the belt. A still further object of the present invention is to provide a conveyor construction that includes a center drive construction that minimizes the number of components and provides a compact design that can be easily threaded with the conveyor belt. Yet a further object of the invention is to provide a conveyor construction having a transfer tail including a stiffener bar that provides the required strength for increased width conveyors while maintaining a small diameter roller. It is yet a further object of the invention to provide for tensioning mechanisms and tracking mechanisms on both end of the conveyor for long belt lengths.

SUMMARY OF THE INVENTION

The present invention relates to a conveyor assembly having a modular conveyor frame that can be modified in both length and width depending upon the desired configuration for the conveyor assembly. The conveyor frame assembly is constructed from a pair of side frame members that are cut to length and extend from a first end to a second end. The side frame members are separated from each other and interconnected by a series of cross members. Each of the cross members is cut to length from a continuous length of extruded metallic material, such as aluminum. The cross members are interconnected between the pair of side frame members by a series of self-tapping screws that are contained within an upper guide channel and a lower guide channel formed in the side frame member. The self-tapping screws are each received within engagement bores formed during the extruded cross member.

Each of the cross members includes a center slot that extends along the entire length of the cross member. The center slot is configured to receive self-tapping screws at any location along the center slot.

The conveyor frame assembly includes a top bed that is formed from multiple bed plates attached to the top surface of the cross members. The top bed includes a center bed plate positioned along the centerline of the conveyor frame. The center bed plate includes a center groove that can receive a rib formed along the inner surface of the conveyor belt to aid in providing proper tracking of the conveyor belt. In addition to the center bed plate, the conveyor frame can include any number of bed plate strips secured to the spaced cross members. The bed plate strips have a selected width and multiple bed plate strips can be used to define the top bed for multiple widths of the conveyor frame assembly. For example, each bed plate strip can have a width of one inch such that the width of the conveyor frame assembly can be made in two inch increments, since a bed plate strip is positioned on each side of the center bed plate. Alternatively, the bed plate strips can have other widths such that the width of the conveyor frame assembly can be adjusted depending upon the user requirements.

The bed plate strips are attached to the cross members by connectors or fasteners, preferably in the form of self-tapping screws. The center slot formed in each cross member allows the bed plate strips to be attached anywhere along the length of the cross member, thereby allowing the conveyor frame to be formed by simply cutting the cross members to the desired width and attaching the bed plate strips.

The spaced side frame members of the conveyor frame assembly are each configured to receive either a tensioning section, an end drive section or a transfer tail section. Each of these sections includes a mounting assembly that allows the respective section to move toward and away from the respective end of the conveyor frame. The mounting assembly includes an upper slide member and a lower slide member on each side of the mounting assembly. The upper and lower slide members are received within upper and lower guide channels, respectively, formed in the extruded side members. The interaction between the slide members and guide channels allow the mounting assembly to move along the longitudinal length of the conveyor frame assembly.

The upper and lower slide members on each side of the mounting assembly are connected to each other at their respective outer ends by a pivot rod. The pivot rod passes through a cross bar extending between the opposite sides of the mounting assembly. The pivoting connection between the slide members and the cross bar allows the orientation of the mounting assembly to be slightly skewed relative to the conveyor frame when the mounting assembly is positioned along the conveyor frame assembly. The skewing of the mounting assembly allows for belt tracking after the conveyor belt has been tensioned.

The conveyor frame assembly includes a tensioning assembly used to tension the conveyor belt. The tensioning assembly includes a movable gear rack positioned in each of the side frame members. Specifically, a gear rack is received within a center guide channel formed in each of the side frame members. A pinion extends across the width of the conveyor frame assembly and engages the pair of laterally spaced gear racks. Rotation of the pinion results in the simultaneous extension or retraction of the gear racks for extending and retracting the mounting assembly in unison to adjust the position of the mounting assembly and attached rollers to control the tension in the conveyor belt. The pinion is engaged with a pair of bearings fixed to the side frame members to provide rotatable mounting of the pinion to the conveyor frame assembly. Each end of the pinion is provided with an engagement structure, such as an irregular opening, to enable a user to rotate the pinion to adjust belt tension.

Belt tracking for the conveyor frame assembly of the present invention is provided by a pair of tracking adjustment assemblies positioned within each of the side frame members. Specifically, each tracking adjustment assembly includes a main body contained within the center guide channel formed in each of the side frame members. The main body is movable along the center guide channel and has an inner end in contact with the gear rack. The outer end of the main body is positioned in contact with the mounting assembly of either the tensioning section, the drive section or the transfer tail section. Thus, as the pinion rotates, the main body cooperates with the gear rack to move the mounting assembly into and out of the conveyor frame.

The main body of the tracking adjustment assembly includes a jack screw movable into and out of the outer end of the main body. The head of the jack screw contacts the cross bar of the mounting assembly such that movement of the jack screw into and out of the main body of the tracking adjustment assembly changes the orientation of the mounting assembly. The orientation of the mounting assembly affects the attached rollers and adjusts the belt tracking. Since a separate tracking adjustment assembly is provided on each side of the conveyor frame, tracking adjustments can be performed independently for each side of the conveyor belt. The jack screw positioned at the outer end of the tracking adjustment assembly is accessible through an access slot formed in each head plate of the mounting assembly. A tool can be inserted through the access slot to adjust the position of the jack screw relative to the body of the tracking adjustment assembly.

The tensioning assembly and tracking adjustment assembly of the conveyor assembly of the present invention are independent from each other such that if additional tension is applied to the conveyor belt, the additional tension does not disrupt the tracking adjustments. Therefore, once the conveyor belt has been properly tracked, increasing tension as the conveyor belt stretches does not disrupt the previous tracking adjustment.

The transfer tail section utilized with the conveyor frame assembly includes an upper transfer roll and a lower transfer roll. The upper and lower transfer rolls are each segmented rollers supported along a center shaft. The segmented rollers each include a pair of bearings having an outer race and an inner race. The outer race of each bearing is friction fit into contact with the inner surface of the roller, while the inner race is spaced from the center shaft. A compression washer is used to lock the inner race of the bearing upon compression from each side of the center shaft. The transfer tail section further includes a stiffener bar extending across the width of the transfer tail section to provide additional structural rigidity for the transfer tail section.

The conveyor frame assembly of the present invention can receive a center drive assembly. The center drive assembly includes a pair of spaced side plates that are secured to the side frame members by a pair of mounting rails. The mounting rails are received within either the upper guide channel or lower guide channel formed in the side frame member.

The center drive assembly includes a single drive roller, a guide roller and a tension roller. The tension roller has a center shaft that is connected at both its first and second ends to a pair of spaced tensioning cylinders. The tensioning cylinders each include a piston rod that is extendable to move the tensioning roller along a pair of longitudinal slots formed in the side plates. As the tensioning roller moves along the slots, the tensioning roller takes up or releases slack into the conveyor belt. The center frame assembly of the invention provides a convenient and easily accessible structure for removing and replacing conveyor belts.

The various features of the invention can be separately incorporated into a conveyor structure, and each provides certain advantages, such as reduction in the number of components, strength of the conveyor frame, or ease of manufacture, assembly and operation. In a particularly preferred form, the features are employed in combination to provide a conveyor construction which involves significant improvement in components, assembly and operation. Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 9 is a partial section view illustrating a tensioning assembly and tracking adjustment assembly of the present invention;

FIG. 10 is a side view similar to FIG. 9 illustrating the tracking adjustment assembly of the present invention;

FIG. 11 is a view similar to FIG. 10 further illustrating the operation of the tracking adjustment assembly;

FIG. 12 is a partial section view taken along line 12—12 of FIG. 9;

FIG. 13 is a section view taken along line 13—13 of FIG. 9;

FIG. 16 is a side view illustrating the center drive assembly of the present invention;

FIG. 17 is a section view taken along line 17—17 of FIG. 16;

DETAILED DESCRIPTION OF THE INVENTION

Figure 1:
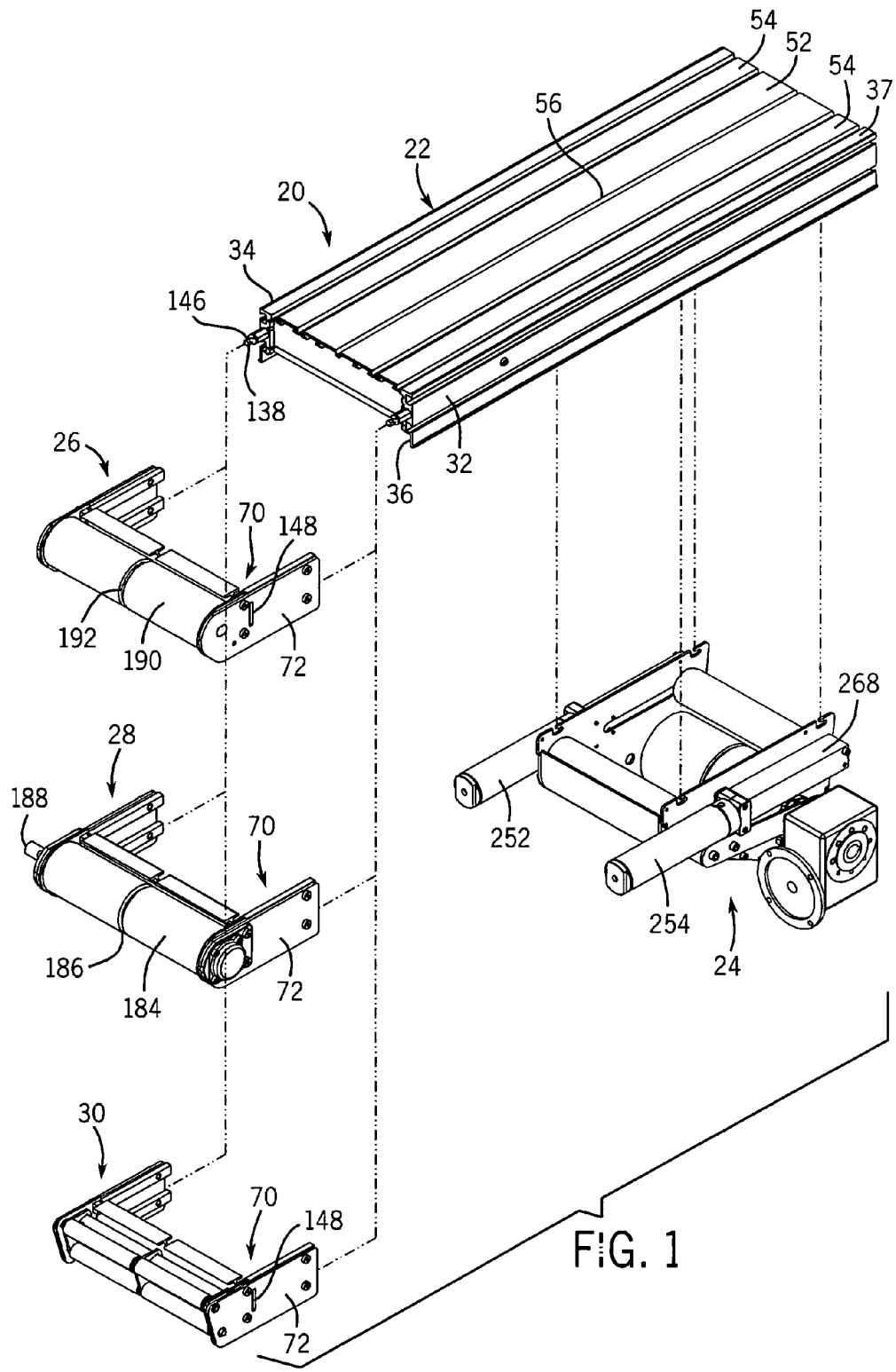
FIG. 1 is an exploded perspective view of the modular frame conveyor of the present invention illustrating multiple components that can be mounted to the conveyor frame.

FIG. 1 illustrates a conveyor assembly 20 constructed in accordance with the present invention. Generally, the conveyor assembly 20 includes a conveyor frame assembly 22, a center drive assembly 24 and either a tensioning section 26, an end drive section 28 or a transfer tail section 30. In FIG. 1, although the tensioning section 26, end drive section 28 and transfer tail 30 are illustrated as being attachable only to the first end of the conveyor frame assembly 22, it should be understood that a similar arrangement can be utilized on the opposite end of the conveyor frame assembly 22. Although not shown in FIG. 1, an endless conveyor belt is mounted over the frame assembly and moved by either the center drive assembly 24 or the end drive section 28 in a conventional manner.

As illustrated in FIG. 1, the conveyor frame assembly 22 generally includes a pair of side frame members 32, 34 that each extend between a first end 36 and a second end 37. In the preferred embodiment of the invention, the side frame members 32, 34 are preferably formed from a lightweight metal such as aluminum in an extrusion process, although it is understood that other materials and forming methods may be employed. The length of each of the side frame members 32, 34 can be selected by a customer such that the length of the conveyor frame assembly 22 is determined by the length of each of the side frame members 32, 34.

Figure 5:
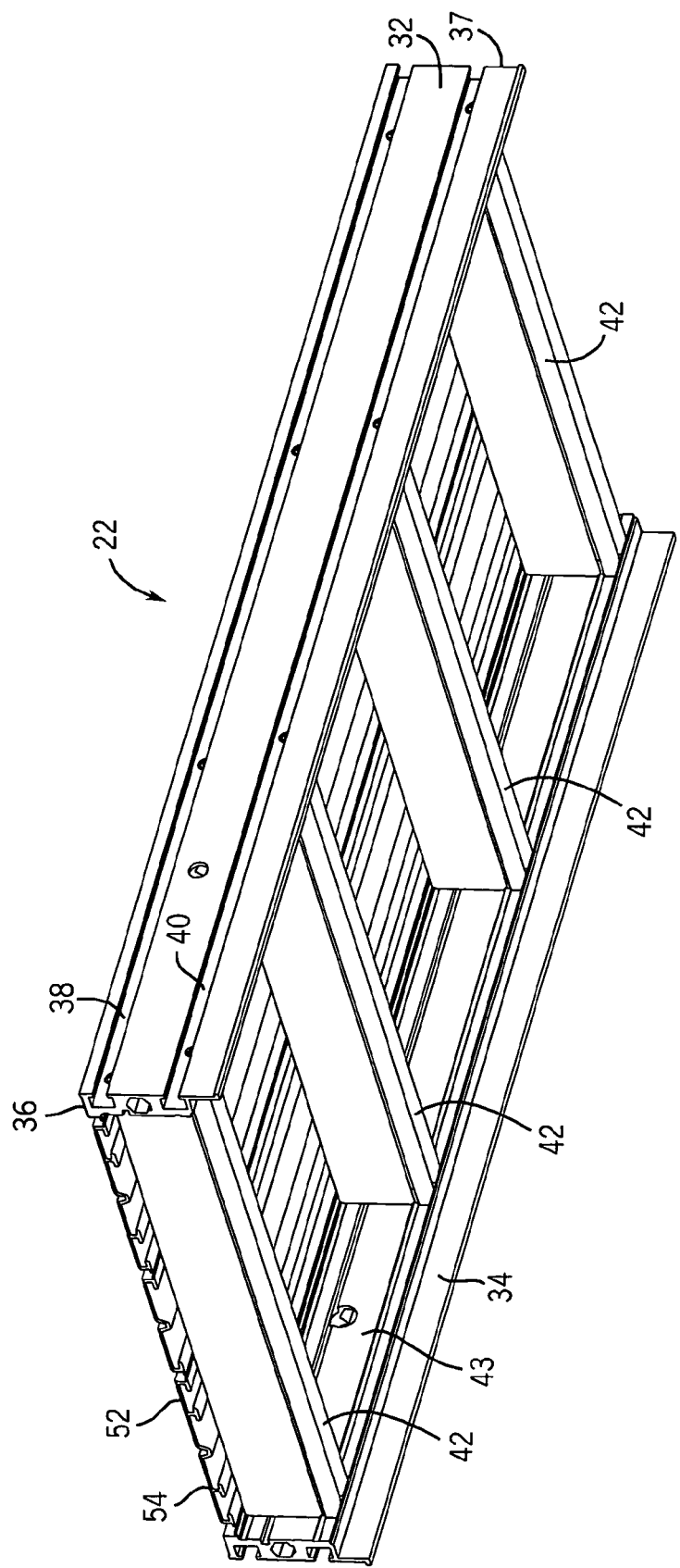
FIG. 5 is a bottom perspective view of the modular frame.

As can best be seen in FIG. 5, each of the side frame members 32, 34 includes a pair of open slots 38, 40. The slots 38, 40 extend along the entire length of each side frame member 32, 34 and provide a point of attachment for various components, as will be described in detail below.

As illustrated in FIG. 5, the conveyor frame assembly 22 includes a plurality of cross members 42 spaced between the first end 36 and second end 37 of the side frame members 32, 34. The cross members 42 extend between the inner walls 43 of the side frame members 32, 34 and provide the required spacing and support for the conveyor frame assembly 22. In the preferred embodiment of the invention, each of the cross members 42 is also formed from a lightweight metal such as aluminum in an extrusion process, although it is understood that other materials and forming methods may be employed. Each cross member 42 is cut to length depending upon the specific width of the conveyor frame assembly 22. In this manner, the width of the conveyor frame assembly 22 can be easily modified by simply cutting each of the cross members 42 to the desired length.

Figure 19:
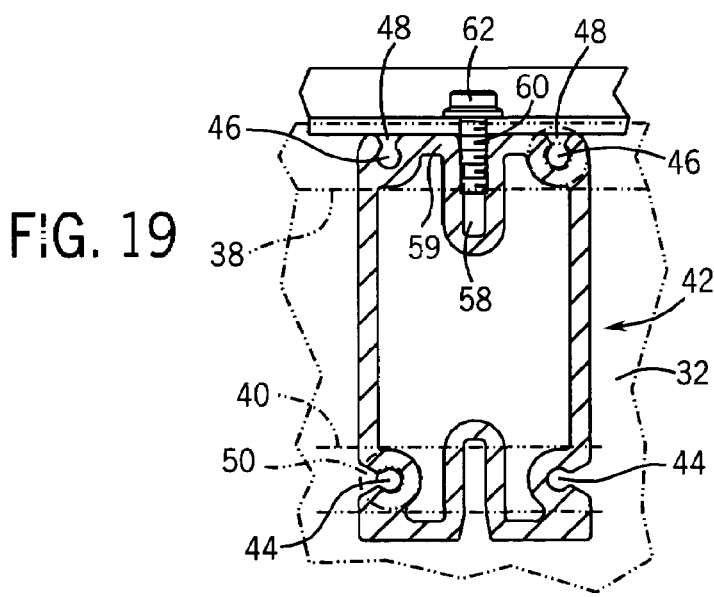
FIG. 19 is a section view taken along line 19—19 of FIG. 12.

Referring now to FIG. 19, thereshown is a cross-section of the cross member 42. The cross member 42 includes a plurality of lower engagement bores 44 and a pair of upper engagement bores 46 that each extend along the entire length of the cross member 42. The upper engagement bores 46 include an open slot 48 formed along the top surface of the cross member 42.

During installation of the cross members 42 between the side frame members 32, 34, a self-tapping screw 50 is inserted into the open slot 40 formed in the side frame member 32 and is received within the lower engagement bores 44. Typically, pre-drilled holes are formed in the side members 32, 34 at the locations of the cross members 42. Additional self-tapping screws can extend through the side frame member 32 and be received within the upper engagement bores 46. In this manner, the self-tapping screws can be hidden within the recessed slots 38 and 40 and used to secure the side frame members 32, 34 to the series of spaced cross members 42.

Referring back to FIG. 1, the upper bed of the conveyor frame assembly 22 is formed from a combination of a center bed plate 52 and a plurality of bed plate strips 54. The center bed plate 52 includes a center groove 56 that can receive a center rib formed on the inner surface of an endless conveyor belt. The center groove 56 aids in providing the proper tracking of a moving conveyor belt along the conveyor assembly 20. In the preferred embodiment of the invention, the center bed plate 52 has a standard width, such as eight inches. The width of the bed plate strips 54, however, can vary depending upon the width of the conveyor being constructed. For example, each of the bed plate strips 54 could have width of one, two, or three inches. Therefore, when designing a conveyor, the width of the conveyor frame assembly 22 can easily be selected by positioning different numbers of bed plate strips 54 adjacent the center bed plate 52. In the embodiment of the invention illustrated, the narrowest width of the conveyor frame assembly 22 is determined by the width of the center bed plate 52. However, it is contemplated that a more narrow center bed plate 52 could be utilized to further enhance the number of possible conveyor widths available.

Figure 18:
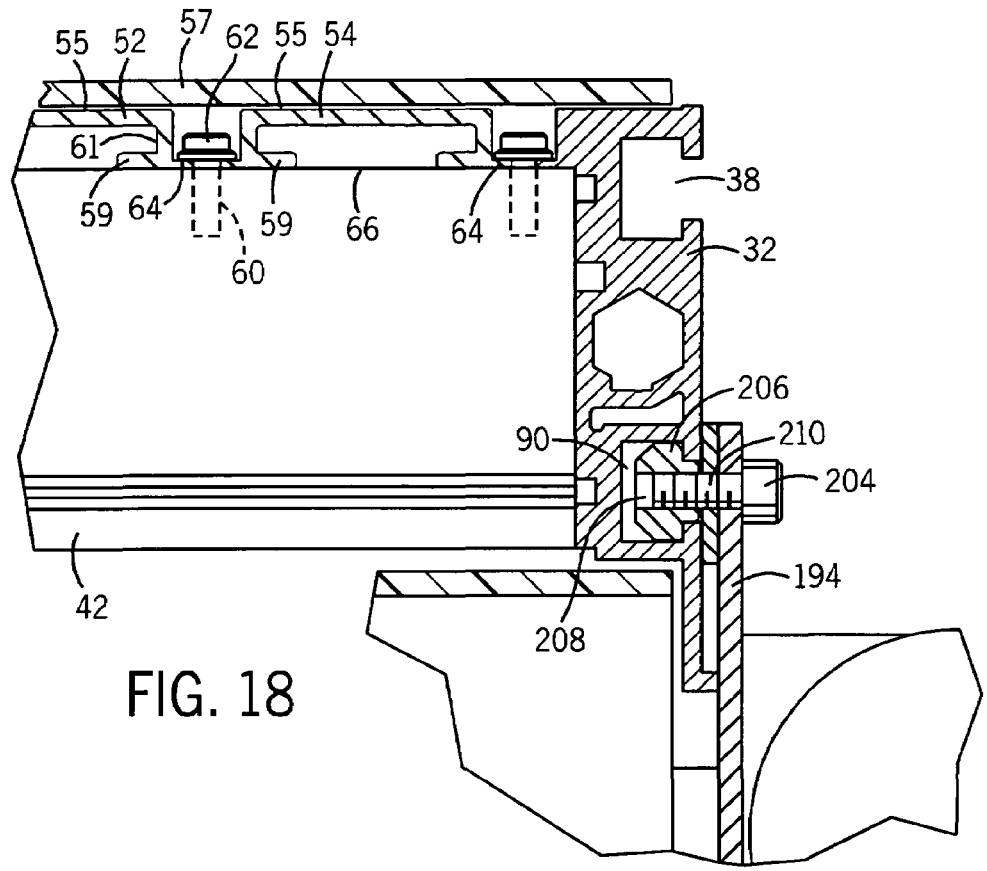
FIG. 18 is a section view taken along line 18—18 of FIG. 16.

As shown in FIG. 18, in the preferred embodiment of the invention, the center bed plate 52 and each of the bed plate strips 54 include a top wall 55 that supports the conveyor belt 57. The top wall 55 is set off from support flange 59 by a sidewall 61. Preferably, the center bed plate 52 and each of the bed plate strips 54 are formed from extruded aluminum in a continuous length strip. The length of the center bed plate 52 and the bed plate strips 54 are then cut to length depending upon the length of the conveyor frame assembly 22.

In the embodiment of the invention illustrated, each of the bed plate strips 54 and the center bed plate 52 are attached to each of the cross members 42, as illustrated in FIG. 5. As illustrated in FIG. 19, each of the cross members 42 includes a center slot 58 extending downward from a top surface 59 and sized to receive a self-tapping screw 60. As shown in FIG. 18, each screw 60 includes a screw head 62 that secures an attachment flange 64 that extends from the support flange 59 formed on the center bed plate 52 and the bed plate strip 54 to the top surface 66 of the cross member 42. As shown in FIG. 19, the self-tapping screw 60 engages the center slot 58 to securely hold the bed plate strips 54 and center bed plate 52 along the conveyor frame assembly. Since the center slot 58 extends along the entire length of the cross member 42 and is formed during the extrusion of each cross member 42, no pre-drilled holes are required to attach the bed plate. Since no pre-drilled holes are required, the flexibility of the conveyor frame is significantly enhanced as compared to prior art conveyor systems.

Figure 4:
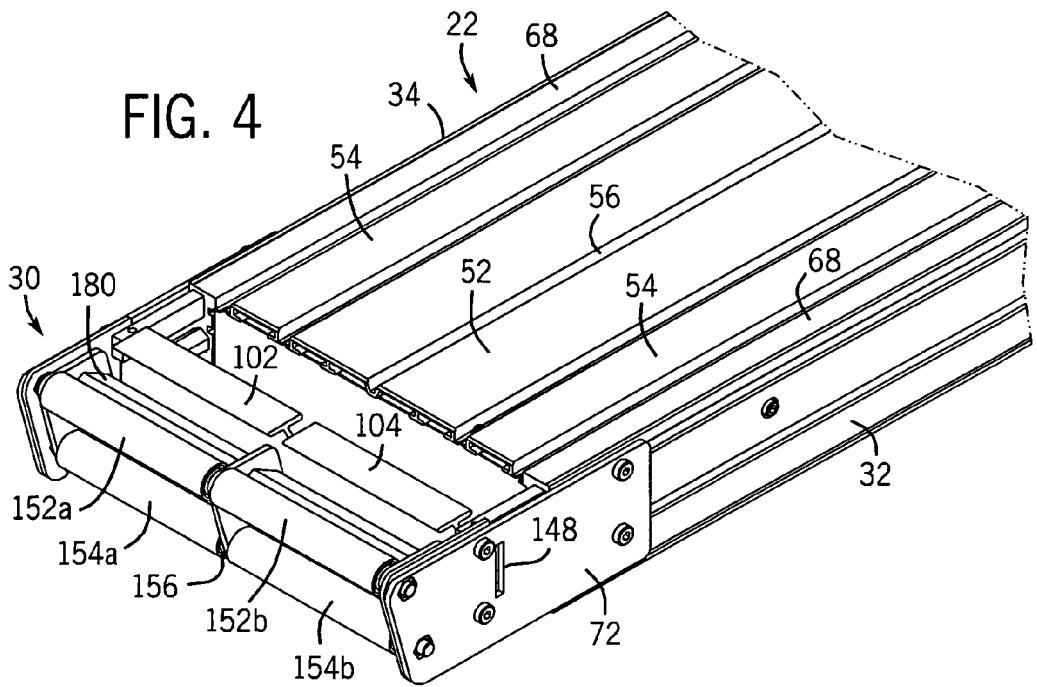
FIG. 4 is a partial perspective view illustrating the position of the transfer tail section on the modular conveyor frame.

As can be seen in FIG. 4, the overall width of the conveyor frame assembly 22 is determined by the number of bed plate strips 54, the width of the center bed plate 52 and the width of the top surface 68 of each side frame member 32, 34. The width of the conveyor frame assembly 22 determines the width of the conveyor belt that can be used to move material using the conveyor assembly of the present invention.

Referring back to FIG. 1, it can be seen that the tensioning section 26, the end drive section 28 and the transfer tail section 30 each include the same mounting assembly 70 for positioning each of the components movably along the pair of side frame members 32, 34. The mounting assembly 70 allows the respective tensioning section 26, end drive section 28 and transfer tail section 30 to move along the longitudinal length of the side frame members 32, 34 to both tension the conveyor belt of the conveyor assembly 20 and adjust the belt tracking. Since each of the mounting assemblies 70 is generally identical, only the mounting assembly 70 of the transfer tail section 30 will be described in detail below.

Figure 2:
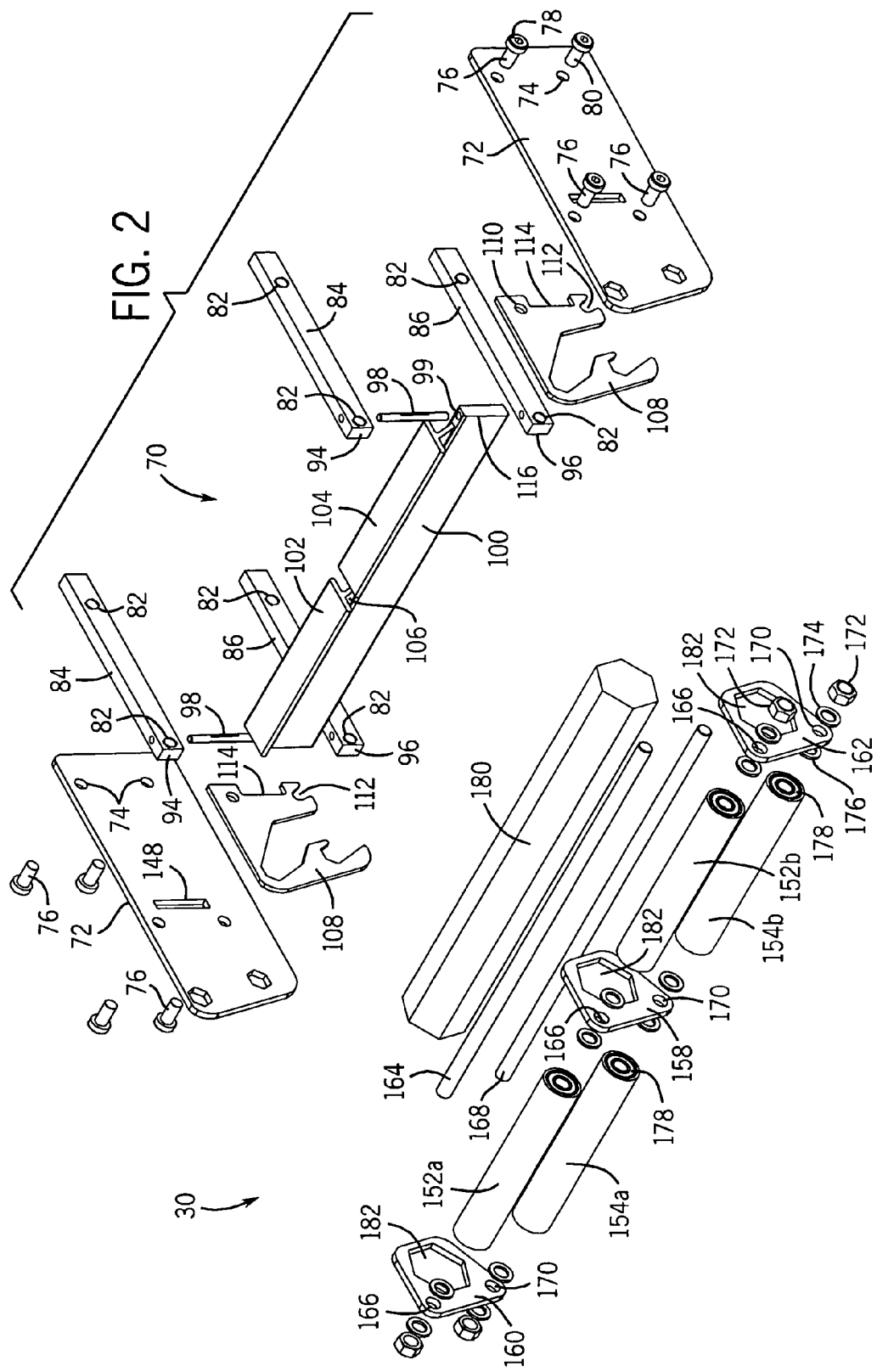
FIG. 2 is an exploded perspective view of a common mounting assembly and the components of a transfer tail section including multiple segmented rollers.
Figures 14, 15:
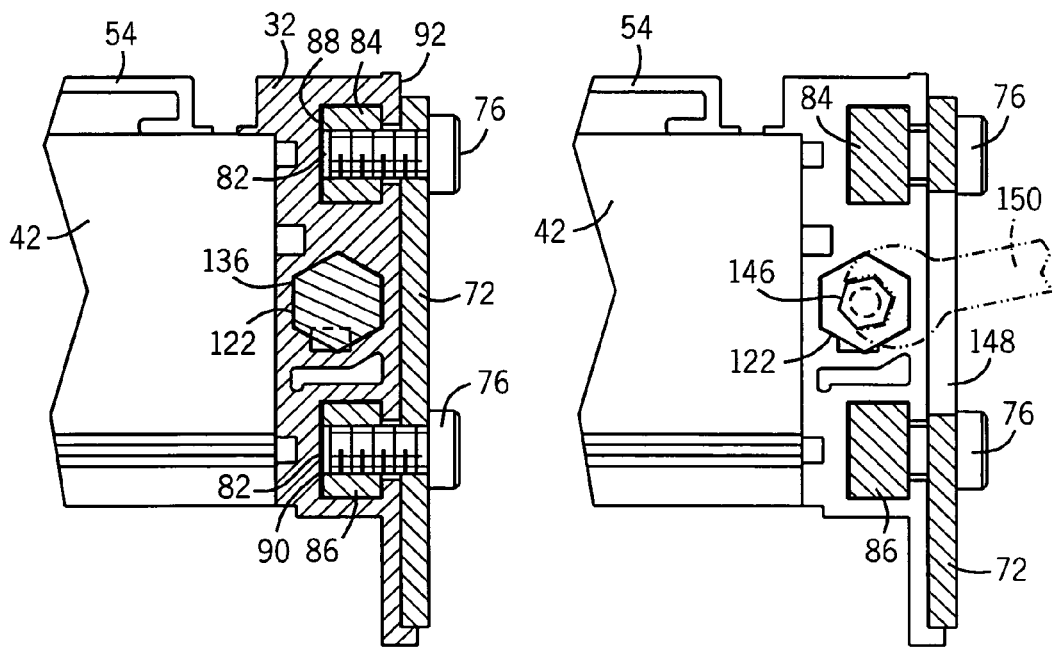
FIG. 14 is a section view taken along line 14—14 of FIG. 9.
FIG. 15 is a section view taken along line 15—15 of FIG. 10.

Referring now to FIG. 2, the mounting assembly 70 includes a pair of spaced head plates 72. The head plates 72 include a series of openings 74 spaced to receive a plurality of connectors 76. Each of the connectors 76 includes an expanded head 78 and a threaded shaft 80. The threaded shaft 80 of each connector is received within a mating bore 82 formed in an upper slide member 84 and a lower slide member 86. The upper and lower slide members 84, 86 are formed from a metallic material, such as cold-rolled steel, the slide members 84, 86 are each sized to be received within an upper guide channel 88 and lower guide channel 90, respectively, of each side frame member 32, 34, as best illustrated in FIG. 14. As can be seen in FIG. 14, the head plate 72 is positioned adjacent to the outer face surface 92 of the side frame member 32 and is held in place by the connectors 76. Both the upper guide channel 88 and the lower guide channel 90 are formed in the side frame member 32 during the extrusion of the side frame member 32 and extend along the entire length of the side frame member 32.

Referring back to FIG. 2, the upper slide member 84 and the lower slide member 86 are joined to each other at their outer ends 94, 96 by a pivot rod 98. The pivot rod 98 connects the upper slide member 84 to the lower slide member 86 and passes through an aligned opening 99 formed in the cross bar 100. As illustrated in FIG. 2, the cross bar 100 joins the right upper and lower slide members 84, 86 to the left upper and lower slide members 84, 86. The cross bar 100 extends across the entire width of the conveyor frame assembly and includes a pair of belt support plates 102, 104 separated by a central gap 106 that receives the center ridge formed on the continuous conveyor belt.

The mounting assembly 70 further includes a pair of spaced support plates 108. The support plates 108 are each supported by a pair of the connectors 76. Specifically, the connectors 76 pass through upper opening 110 and lower opening 112 in the support plate 108 and are received in the upper and lower slide members 84, 86. The support plates 108 further include a notch 114 sized to receive an end 116 of the cross bar 100.

As discussed previously, the receipt of the upper slide member 84 and the lower slide member 86 in the upper guide channel 88 and lower guide channel 90 on each side of the conveyor frame assembly support the mounting assembly 70 within the conveyor frame.

Referring now to FIG. 9, the conveyor frame assembly includes a tensioning assembly 118 that moves the head plate 72 to adjust the conveyor belt tension. Specifically, the tensioning assembly 118 includes a movable gear rack 120 positioned within a center guide channel 122 of the side frame member 32. As can be seen in FIG. 12, a gear rack 120 is positioned on each side of the conveyor frame assembly within the center guide channel 122. The gear racks 120 each receive one end of a pinion 124 that extends across the width of the conveyor frame assembly. The pinion 124 is supported at each of its ends by a bearing assembly 126 and has a pair of outer ends 128 that can be engaged by a user to rotate the pinion 124. As the pinion 124 is rotated, the gear racks 120 move in unison, resulting in movement in the longitudinal direction to tension the conveyor belt.

Referring back to FIG. 9, when the pinion 124 is rotated in the clockwise direction, the gear rack 120 causes the upper slide member 84 and the lower slide member 86 to move out of the upper guide channel 88 and the lower guide channel 90, which moves the entire transfer tail section 30 away from the conveyor frame, causing increased tension in the conveyor belt. Likewise, counter clockwise rotation of the pinion 124 moves the rack 120 in the opposite direction, thereby reducing the tension on the conveyor belt.

As can be seen in FIG. 9, the outer end 130 of the gear rack 120 contacts the inner end 132 of a tracking adjustment assembly 134. The tracking adjustment assembly 134 is positioned between the tensioning assembly 118 and the mounting assembly 70 of the transfer tail section 30 to provide proper belt tracking, as will be described in detail below.

The tracking adjustment assembly 134 includes a main body 136 that is received within the center guide channel 122 of the side frame member 32. As can be seen in FIG. 14, the main body 136 has a hexagonal cross-section and is received within the center guide channel 122, which has a mating hexagonal inner wall surface. Although the main body 136 is shown having a hexagonal shape, it is contemplated by the inventors that the main body could have other shapes while falling within the scope of the present invention.

As can be understood in FIG. 9, as the gear rack 120 moves within the center guide channel 122, the gear rack pushes the main body 136 out of the center guide channel 122 to exert additional tension on the drive belt. As can be understood in FIG. 12, a main body 136 is contained in each of the side frame members 32, 34. Thus, rotation of the pinion 124 will move each side of the transfer tail section 30 out of the side frame members 32, 34 equally to maintain the set conveyor belt tracking.

Referring back to FIG. 9, the tracking adjustment assembly 134 includes a jack screw 138 positioned at the outer end 140 of the main body 136. As can be seen in FIG. 10, the jack screw 138 includes a threaded shaft 142 received within an internally threaded bore 144. The threaded shaft 142 includes a head 146. The head 146 of the jack screw 138 can be used to move the jack screw into and out of the bore 144 formed in the main body 136.

If the jack screw 138 is tightened into the main body 136, that side of the transfer tail section 30 will shift further toward the conveyor frame assembly, as can be understood in FIG. 12. Since each side of the conveyor frame assembly includes its own tracking adjustment assembly 134, adjustment of only one jack screw 138 will cause the transfer tail section 30 to slightly rotate, resulting in better tracking of the conveyor belt. Specifically, the pair of pivot pins 98 used to connect the upper slide member 84 to the lower slide member 86 through the cross bar 100 on each side of the transfer tail section, as illustrated in FIG. 2, allows the mounting assembly 70 to skew slightly, thus resulting in better belt tracking.

Figure 6:
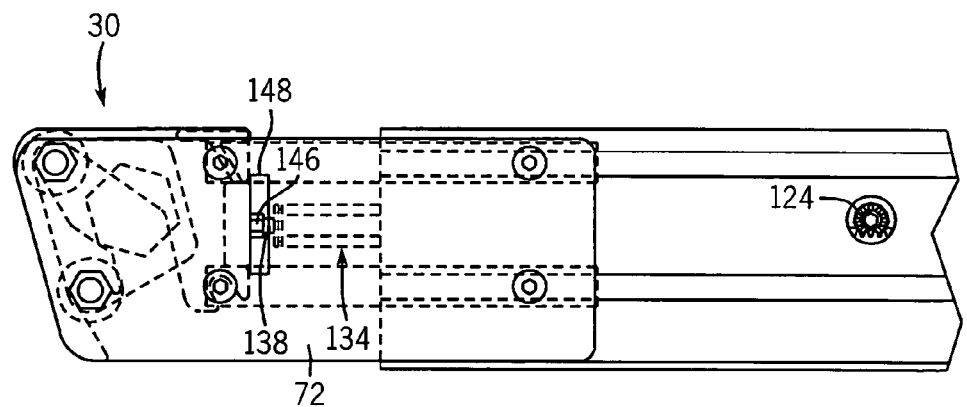
FIG. 6 is a side view of the transfer tail section and modular frame.
Figure 7:
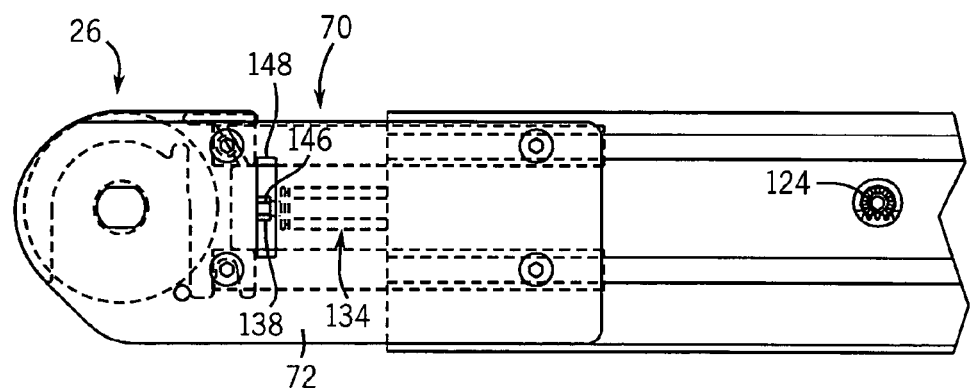
FIG. 7 is a side view of a tensioning section as mounted to the modular frame.
Figure 8:
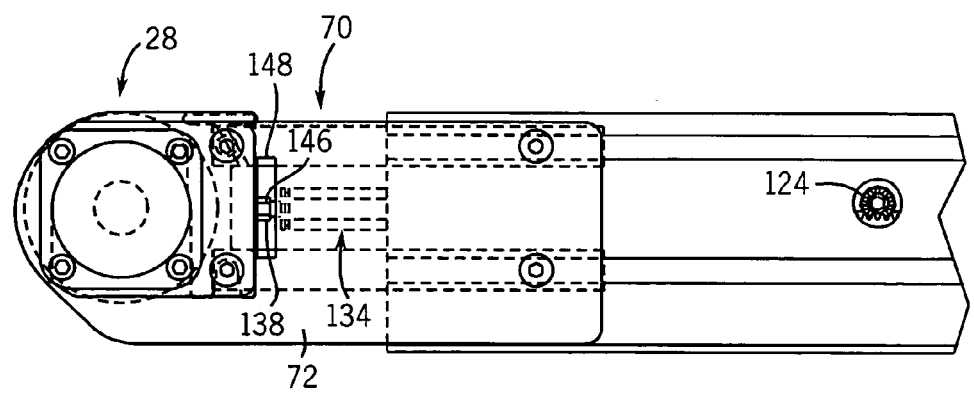
FIG. 8 is a side view illustrating an end drive assembly mounted to the modular frame.

Referring back to FIG. 4, each head plate 72 includes an elongated access slot 148. As shown in FIGS. 6–8, the access slot 148 is generally aligned with the head 146 of the jack screw 138 such that the access slot 148 allows access to the head 146. As can be seen in FIG. 15, a tool 150 can enter through the access slot 148 and adjust the head 146 of the jack screw 138 to provide the required belt tracking.

Referring back to FIG. 11, if the jack screw 138 is adjusted to move the jack screw 138 out of the threaded bore within the main body 136, as illustrated by arrow 149, that side of the mounting assembly 70 is moved further away from the conveyor frame. As can be understood by the above description, the use of the tracking adjustment assemblies 134 on opposite sides of the conveyor frame allow for a variety of adjustments to be made to obtain the proper conveyor belt tracking.

Although the tensioning assembly 118 and tracking adjustment assembly 134 have been shown and described as being utilized with the transfer tail section 30, FIGS. 6–8 illustrate that the same tensioning assembly 118 and tracking adjustment assembly 134 is utilized with the tensioning section 26 and the end drive section 28. Specifically, the tensioning section 26 and drive section 28 include the same mounting assembly 70 that is acted upon by the tensioning assembly 118 and tracking adjustment assembly 134. Further, it is contemplated that the tensioning assembly 118 and tracking adjustment assembly 134 can be included on both ends of the conveyor frame, such that the conveyor belt can be further tensioned on each end, which is particularly desirable in a conveyor having an extended overall length.

As can be understood by the foregoing description, the tensioning assembly 118 and the tracking adjustment assembly 134, as best illustrated in FIG. 12, operate independently from one another such that an adjustment in the tensioning assembly 118 does not affect the current position of the tracking adjustment assembly 134. This allows for a significant advantage since further tension can be applied to the conveyor belt through the tensioning assembly 118 without affecting the tracking that was previously set. This feature is unlike prior art conveyor assemblies in which the tensioning and tracking mechanism were interconnected such that adjusting tension within the conveyor belt had the immediate effect of disrupting the previously set tracking adjustment.

Referring now to FIGS. 2 and 4, thereshown is the specific embodiment of the transfer tail section 30 of the present invention. The transfer tail section 30 generally includes an upper and lower transfer roller each having a reduced diameter such that successive conveyor sections can be placed next to each other to transfer items between the successive conveyor sections. In the embodiment of the invention illustrated in FIG. 4, the transfer tail section includes a pair of upper rollers 152a and 152b and a pair of lower transfer rollers 154a and 154b. The upper transfer rollers 152a and 152b, as well as the lower transfer rollers 154a and 154b, are separated by a central gap 156 that receives the center rib formed on the inner surface of the continuous conveyor belt. As illustrated in FIG. 2, the upper and lower transfer rollers are segmented and are separated by a center support bracket 158. The center support bracket 158 and lateral support brackets 160, 162 provide support for the pair of transfer rollers. As illustrated in FIG. 4, the upper and lower transfer rollers are supported between the pair of spaced head plates 72 and define the outermost end of the conveyor assembly.

Referring now to FIG. 2, the upper transfer rollers 152a and 152b are supported along a center shaft 164. The center shaft 164 passes through aligned upper openings 166 in each of the lateral support brackets 160, 162 and the center support bracket 158. Likewise, a second center shaft 168 passes through corresponding lower openings 170 formed in the lateral support brackets 160, 162 and the center support bracket 158. Each end of the center shafts 164, 168 receives a threaded nut 172 positioned on the outside of the lateral support brackets 160, 162. The threaded nut 172 contacts a washer 174, which is in contact with the lateral support bracket 160, 162. A corresponding washer 176 is positioned on the opposite side of the lateral support bracket 160 and contacts the inner race of a bearing 178 positioned within the generally hollow upper and lower transfer roller 152, 154. The bearing 178 includes an outer race in frictional contact with the inner diameter of the respective roller and an inner race spaced slightly from the respective center shaft 164, 168.

During construction of the transfer tail section 30, the center shafts 164, 168 are positioned within the upper and lower transfer rollers and the threaded nuts 172 attached to opposite ends of each of the center shafts 164, 168. As the threaded nuts 172 are tightened along the respective center shafts 164, 168, the compressive force locks the inner race of each bearing 178 in place such that the upper transfer rollers 152a, 152b and lower transfer rollers 154a, 154b are rotatable about the respective center shaft. The use of a segmented upper and lower roller allows for the rollers to be made of a small diameter while retaining the required strength to support the conveyor belt under tension.

As shown in FIG. 2, the transfer tail section 30 includes a stiffener bar 180 having a hexagonal outer surface. The stiffener bar 180 is received within corresponding openings 182 formed in each of the lateral support brackets 160, 162 and center support bracket 158. The stiffener bar 180 provides the required stiffness and stability for the transfer tail section 30 for widths of conveyors up to forty-eight inches. Preferably, the stiffener bar 180 is formed from a solid metal, such as cold-rolled steel. Although the embodiment in FIG. 2 contemplates the use of the stiffener bar 180, it is contemplated by the inventors that the stiffener bar 180 could be eliminated if the width of the conveyor were narrow enough such that the added strength and stability provided by the stiffener bar 180 is not required.

Referring back to FIG. 1, the conveyor frame assembly 22 is shown in one alternate embodiment as being used with an end drive section 28. The end drive section 28 includes a drive roller 184 positioned between the head plates 72 of the mounting assembly 70. The drive roller 184 includes a center groove 186 that receives the center rib formed on the inside surface of the conveyor belt. As illustrated, the drive roller 184 includes an extending shaft 188 that can be connected to a drive motor (not shown). In the embodiment of the invention illustrated in FIG. 1, the drive motor can be mounted directly to the head plate 72 of the mounting assembly 70 such that the drive motor is movable along with the entire end drive section 28. In this manner, the end drive section 28 can be used for belt tightening since the motor and all remaining drive components move along with the mounting assembly 70.

FIG. 1 also illustrates the tensioning section 26 as being attachable to the conveyor frame assembly 22. The tensioning section 26 includes a single roller 190 having a center groove 192 for receiving the rib formed on the inner surface of the conveyor belt. As previously discussed, the interaction between the center groove 192 and the rib formed on the conveyor belt aids in tracking the conveyor belt along the conveyor frame assembly 22. The roller 190 is mounted between the pair of head plates 72 and is movable along with the mounting assembly 70, as previously discussed.

As illustrated in FIGS. 1 and 6–8, the tensioning section 26, the end drive section 28 and the transfer tail section 30 all include the access slot 148 that provides access to the head 146 of the jack screw 138. Thus, the tracking adjustment assembly 134 can be utilized in each embodiment to adjust the tracking of the belt once tension has been applied.

Referring back to FIG. 1, the conveyor frame assembly 22 can also be utilized with the center drive section 24 in situations in which the end drive section 28 cannot be utilized. The center drive section 24 is mounted to the pair of side frame members 32, 34 and extends beneath the conveyor frame assembly 22. Although center drive sections have been known for quite some time, the center drive section 24 of the present invention eliminates many operating components and provides an ease of use not currently available in conveyor assemblies.

Figure 3:
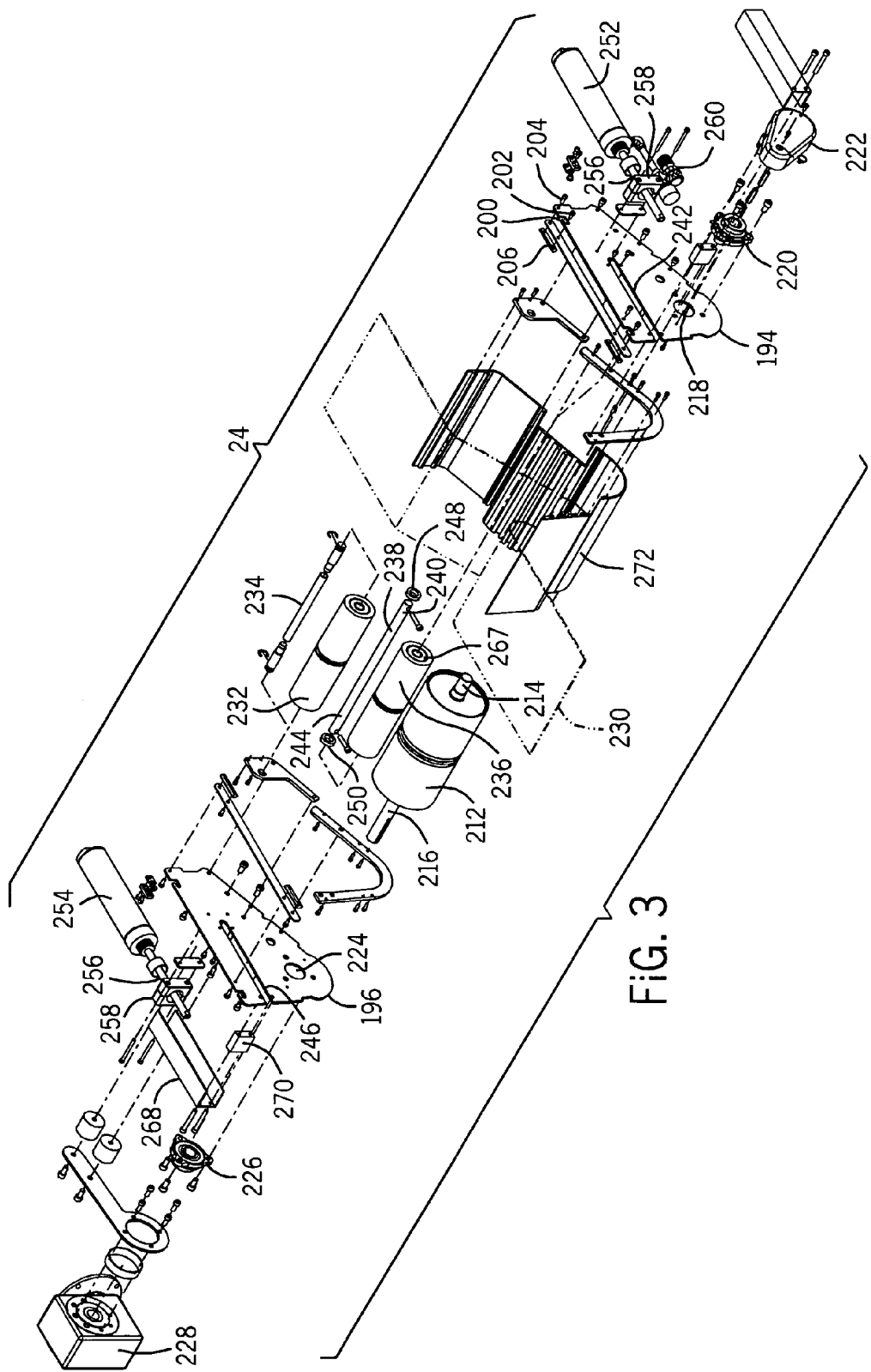
FIG. 3 is an exploded perspective view of the center drive assembly of the modular conveyor of the present invention.

Referring now to FIG. 3, thereshown is an exploded view of the center drive section 24. The center drive section 24 includes a pair of spaced side plates 194, 196 used to secure the entire structure to the conveyor frame assembly. FIG. 16 illustrates the side plate 194, although the opposite side plate 196 has an identical construction. The side plate 194 includes a top edge 198 having a pair of L-shaped slots 200 that each receive a connector 202. An additional pair of connectors 204 pass through holes in the top edge 198.

Referring now to FIG. 18, a mounting rail 206 is positioned within the lower guide channel 90 of the side frame member 32. The mounting rail 206 includes a plurality of internally threaded bores 208 that receive the threaded shaft 210 of the connector 204. The mounting rails 206 thus support the side plates 194 along the lower guide channel 90 of the side frame members 32, 34.

Referring back to FIG. 3, the center drive section 24 includes a drive roller 212 having a center shaft extending between a first end 214 and a second end 216. The first end 214 extends through an opening 218 in the side plate 194 and is retained within a bearing assembly 220. The bearing assembly 220 is mounted to the side plate 194 by a plurality of connectors and is enclosed within a shield 222. The second end 216 of the center shaft passes through an opening 224 in the opposite side plate 196 and is received within a bearing assembly 226 mounted to the side plate 196 by a plurality of connectors. The second end 216 is further coupled to a drive motor 228 which provides the required motive force to rotate the drive roller 212 and thus move the conveyor belt, illustrated by broken lines 230 in FIG. 3.

The center drive assembly 24 further includes a stationary guide roller 232 mounted about a center shaft 234. The center shaft 234 is supported at each end by the side plates 194, 196. The guide roller 232 is rotatable about the center shaft 234 and guides the conveyor belt 230 as it enters the center section 24, as illustrated in FIG. 16. After the conveyor belt 230 passes over the guide roller 232, the conveyor belt passes beneath the drive roller 212, as illustrated.

Referring back to FIG. 3, the center section 24 further includes a tension roller 236 that is rotatably supported about a center shaft 238. The first end 240 of the center shaft 238 extends through a horizontal slot 242 formed in the side plate 194. Likewise, the second end 244 of the center shaft 238 extends through a similar slot 246 formed in the side plate 196. A bearing 248, 250 supports the respective first and second ends 240, 244 of the center shaft 238 within the slots 242, 246. As will be described, the center shaft 238 and tension roller 236 are movable along the length of the slots 242, 246 to adjust the position of the tension roller 236, and thus the tension of the conveyor belt within the center drive section 24.

Center drive section 24 includes a pair of tensioning cylinders 252, 254 positioned on opposite sides of the center drive section, as illustrated in FIGS. 1 and 3. As illustrated in FIG. 3, the tensioning cylinders 252, 254 each include an extendable piston rod 256. The piston rod 256 passes through a mounting block 258 that is used to support the tensioning cylinder 252, 254 along the face of the side plates 194, 196. The tensioning cylinders 252, 254 are connected to a pressurized supply of air through an inlet assembly 260. Each of the tensioning cylinders 252, 254 is operable through a supply of pressurized air to extend and retract the piston rod 256.

Referring now to FIG. 17, the outer ends 262 of the piston rod 256 include an internally threaded bore 264 that receives a threaded connector 266. The threaded connector 266 passes through the second end 244 of the center shaft 238 such that the connector 266 secures the center shaft 238 to the piston rod 256. A similar connection exists between the first end 240 of the center shaft 238 and the piston rod 256 of the tensioning cylinder 252. A bearing assembly 267 is contained at each end of the tension roller 236 that allows the roller 236 to rotate about the shaft 238.

During operation of the conveyor assembly of the present invention including the center section 24, the tensioning cylinders 252, 254 can be activated to extend or withdraw the respective piston rods 256. As the piston rods 256 are extended or retracted, the center shaft 238 moves along the slots 246, 242 formed in the side plates 194, 196 to adjust the position of the tension roller 236.

As illustrated in FIGS. 3 and 17, a cover plate 268 is mounted over the piston rod 256 and is supported by a mounting block 270. The cover plate 268 protects the piston rod 256 and provides a smooth appearance for the center drive 24, as illustrated in FIG. 1.

Referring back to FIG. 3, the center drive further includes a shroud 272 that encloses the drive roller 212, guide roller 232 and tension roller 236.

As can be seen in FIG. 16, the conveyor belt passes over the tension roller 236 and continues to move along the length of the conveyor frame assembly. During removal and installation of the conveyor belt 230, the piston rods are moved to their completely extended position such that the tension roller 236 is moved to the completely outward position, as illustrated in FIG. 16. Once in this position, the conveyor belt 230 can be threaded over the guide roller 232, drive roller 212 and tension roller 236. Once the conveyor belt is in place, the piston rods are retracted, causing the tension roller 236 to move inward and thus increase the amount of belt travel within the center drive section 24. The pair of tensioning cylinders 252, 254 can thus take up slack in the belt once the belt has been installed.

Figure 20:
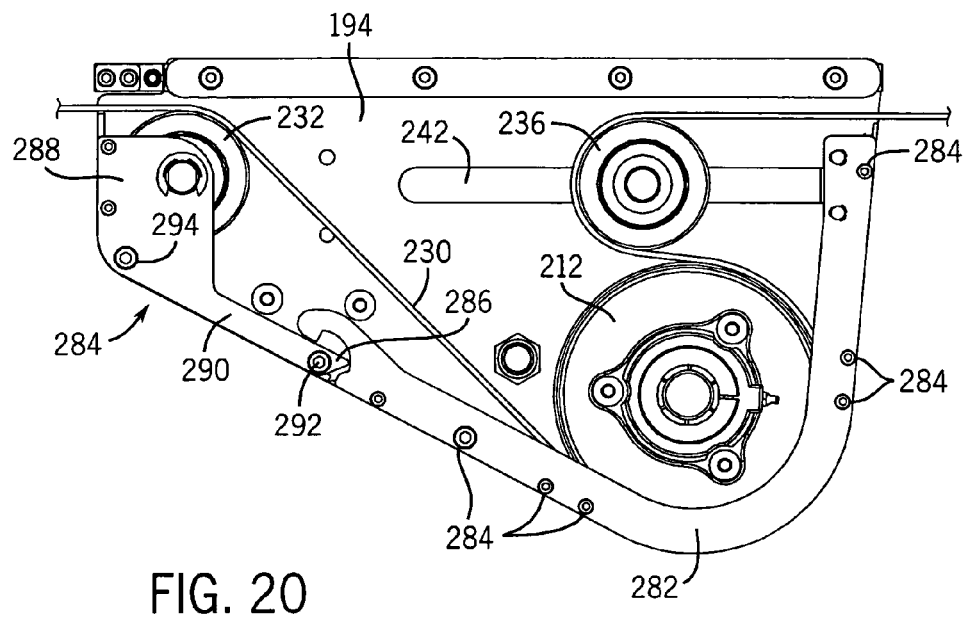
FIG. 20 is a side view illustrating an alternate embodiment for the center drive assembly of the present invention in a belt-engaging position.
Figure 21:
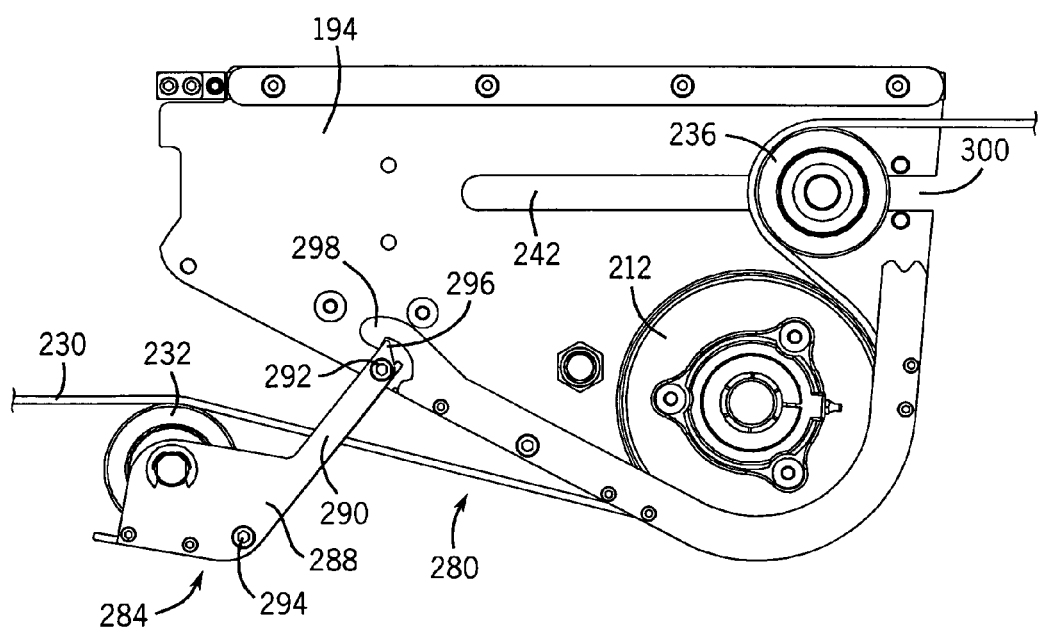
FIG. 21 is a side view illustrating the alternate embodiment of the center drive assembly in the retracted, belt-changing position.

Referring now to FIGS. 20 and 21, thereshown is an alternate, preferred embodiment for the center drive section, as referred to by reference numeral 280. The center drive section 280 shown in FIG. 20 operates in an identical manner to the center drive section 24 previously described. However, the center drive section 280 includes further enhancements that aid in the removal and replacement of the conveyor belt 230.

As illustrated in FIG. 20, the center drive section 280 includes the pair of side plates 194 each having a slot 242 to support one end of the tension roller 236. As previously described, the tension roller 236 is movable along the length of the slot 242 to adjust the tension on the conveyor belt 230. A tensioning roller guard 282 is attached to each of the spaced side plates 194 by a series of connectors 284 to both close the outer end of the slot 242 and protect the moving conveyor belt 230 as it passes around the drive roller 212.

As illustrated in FIG. 20, the center drive section 280 includes a guide roller assembly 284 mounted between the pair of side plates 194. The guide roller assembly 284 is pivotally mounted to each of the side plates 194 about its first end 286. Specifically, the guide roller assembly 284 includes a pair of spaced side brackets 288 each having an arm 290 mounted to the side plate 194 by a connector 292. The connector 292 defines a pivot axis about which the guide roller assembly 284 can rotate. Specifically, the guide roller assembly 284 is pivotable between the belt-engaging position shown in FIG. 20 and the belt-changing position as shown in FIG. 21.

When the guide roller assembly 284 is in the belt-engaging position shown in FIG. 20, the guide roller 232 exerts tension on the conveyor belt 230 and the conveyor assembly can be operated in a normal manner. The side brackets 288 of the guide roller assembly 284 are held in the belt-engaging position of FIG. 20 by a pair of connectors 294 that are each received in one of the side plates 194.

When it is desired to change the conveyor belt 230, the tension roller 236 is moved to the retracted position shown in FIG. 21 to introduce slack into the belt 230. Once tension has been removed from the belt 230 the connectors 294 are removed from between each of the side brackets 288 and the respective side plate 194. Once the connectors 294 have been removed, the guide roller assembly 284 can be pivoted into the belt-changing position, as shown in FIG. 21. As illustrated in FIG. 21, an outer end 296 of each arm 290 engages a hook member 298 formed on the outer end of the tension roller guard 282 to support the weight of the guide roller assembly 284. Once the guide roller assembly 284 has been pivoted into the position shown in FIG. 21, the pair of connectors 292 can be removed and the entire guide roller assembly 284 separated from the center drive section 280.

Once the guide roller assembly 284 has been removed, the tension roller guard 282 is removed by loosening connectors 284. After removing the tension roller guard 282, each end of the tension roller 236 can be disconnected from the respective piston rods 256 by removing connectors 266, as illustrated in FIG. 17. Once the connectors 266 have been removed, the tension roller 236 can be slid out of the open end 300 of the slot 242, as shown in FIG. 21.

Once both the tension roller 236 and the guide roller assembly 284 have been removed, the belt can be easily changed and only needs to pass over the drive roller 212.

Once a new belt has been installed, the steps identified above for removing the belt are reversed and tension reapplied to the belt by adjusting the position of the tension roller 236 along the slot 242.

Figure 22:
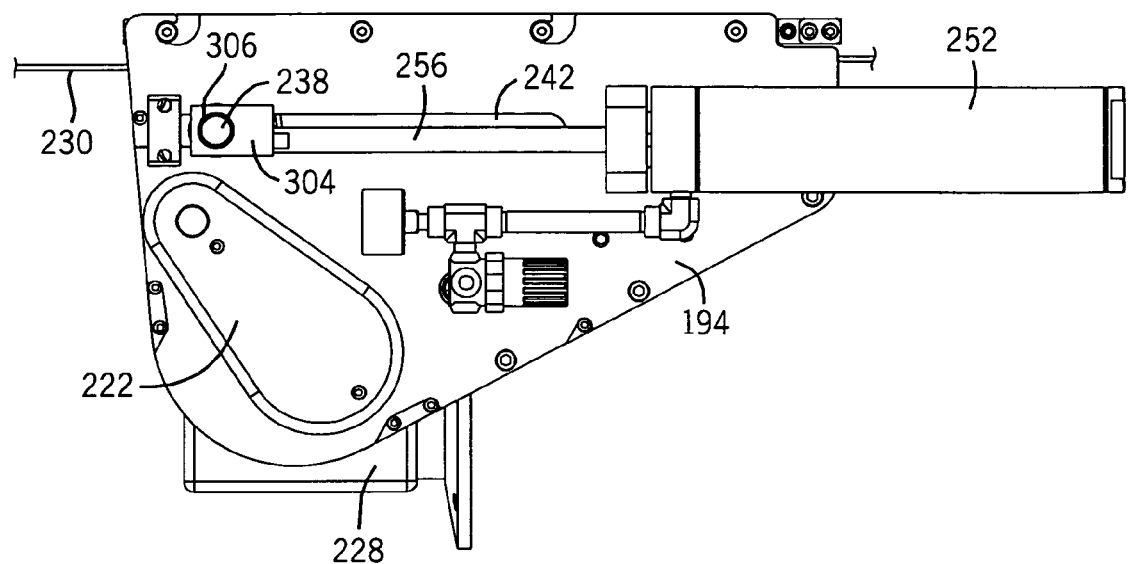
FIG. 22 is a side view illustrating an alternate embodiment for the attachment between the tensioning cylinders and the tension roller.
Figure 23:
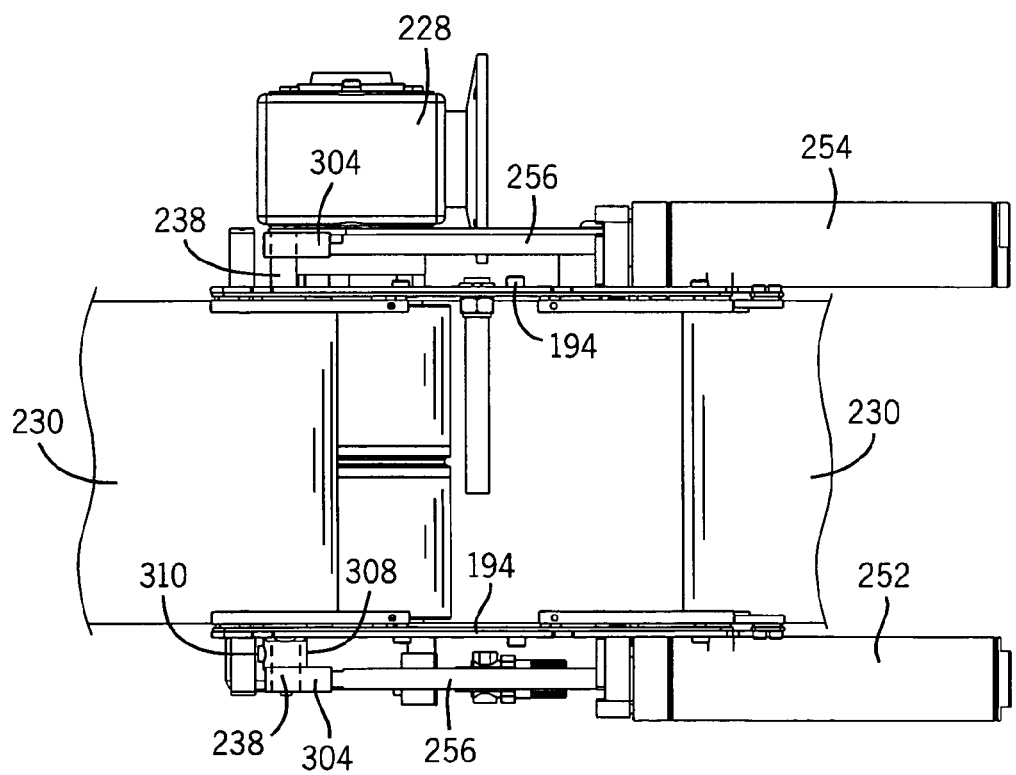
FIG. 23 is a top view illustrating the engagement between the tensioning cylinders and the tension roller.

FIGS. 22 and 23 illustrate an alternate, preferred embodiment for the engagement between the piston rods 256 of the tensioning cylinders 252, 254 and the center shaft 238 of the tension roller. As illustrated in FIG. 22, a retaining block 304 is secured to the outermost end of each piston rod 56. The retaining block 304 includes a circular opening 306 that receives the lateral outer end of the center shaft 238. As illustrated in FIG. 22, the circular opening 306 is sized to receive the outer end of the shaft 238.

Referring now to FIG. 23, a collar 308 surrounds one end of the center shaft 238 and is positioned between the side plate 194 and the retaining block 304. A set screw 310 can be tightened to engage the center shaft 238 to prevent the lateral movement of the center shaft relative to the side plates 194. As illustrated in FIG. 23, the opposite end of the center shaft 238 is simply received within the retaining block 304 coupled to the piston rod 256 of the tensioning cylinder 254. Thus, the embodiment of the invention requires only one collar 308 and set screw 310.

An advantage of the embodiment illustrated in FIGS. 22 and 23 is the ease with which the tensioning cylinder can be removed during the belt changing procedure. After the guide roller has been removed and the tension roller guard 282, shown in FIG. 20, has been removed, the set screw 310 of the collar 308 is loosened. Once the collar 308 has been loosened, the center shaft 238 is pushed laterally until the end is no longer received within the retaining block 304 coupled to the piston rod 256 of the tensioning cylinder 252. Once the end of the center shaft has been moved laterally, the piston rod 256 of the tensioning cylinder 252 can be retracted to move the retaining block 304 into a retracted position.

Once the first piston rod 256 and retaining block 304 have been retracted, the center shaft is pushed in the opposite direction to disengage the end of the center shaft 238 from the retaining block 304 associated with the tensioning cylinder 254. Once the end of the center shaft 238 is no longer engaged in the retaining block 304, the piston rod 256 of the tensioning cylinder 254 can also be retracted.

Once both of the piston rods 256 have been retracted, the tension roller 236 can be freely slid out of the slot 242 through the open end 300 of each slot, as best illustrated in FIG. 21. By utilizing the embodiment illustrated in FIGS. 22 and 23, only a single set screw 310 needs to be loosened in order to remove the tension roller 236.

Various alternatives and embodiments are contemplated as being within the scope of the following claims particularly pointing out and distinctly claiming the subject matter regarded as the invention.

We claim:

1. A center drive assembly for a conveyor having a frame assembly extending from a first end to a second end and including a pair of spaced side frame members, at least one end assembly mounted between the side frame members and movable toward and away from the first end of the frame assembly, and a continuous conveyor belt having an upper run and a lower run and engaged around the end assembly and positioned between the side frame members, the center drive assembly comprising:

a pair of spaced side plates each configured for attachment to one of the side frame members between the first end and the second end of the frame assembly, the side plates extending below the side frame members;

a guide roller assembly pivotally mounted between the pair of spaced side plates, wherein the guide roller assembly is pivotally movable between an operating position in which the lower run of the conveyor belt passes over the guide roller assembly and enters into the center drive assembly and a belt-changing position in which the guide roller assembly is pivoted away from the side frame members to reduce the tension in the conveyor belt;

a drive roller rotatably mounted between the pair of spaced side plates and positioned such that the lower run of the conveyor belt passes around at least a portion of the outer circumference of the drive roller;

a drive motor mounted to one of the side plates and coupled to the drive roller to rotate the drive roller and move the conveyor belt along the longitudinal length of the frame assembly; and a tension roller extending between the spaced side plates and positioned such that the lower run of the conveyor belt passes around at least a portion of the outer circumference of the tension roller, wherein the guide roller, the drive roller and the tension roller define a belt path through the center drive assembly;

wherein the tension roller is movable relative to the drive roller and the guide roller to modify the length of the belt path.

2. The center drive assembly of claim 1 further comprising at least one tensioning cylinder coupled to the tension roller and mounted to one of the side plates, wherein operation of the tensioning cylinder moves the tension roller relative to the drive roller and the guide roller.

3. The center drive assembly of claim 2 wherein the tension roller is movable parallel to the longitudinal axis of the frame assembly.

4. The center drive assembly of claim 2 wherein each of the side plates includes a slot that receives the tension roller, wherein the tension roller is movable along the slot to modify the belt path.

5. The center drive assembly of claim 2 wherein the tension cylinder includes a cylinder body stationarily mounted to the side plate and a piston rod movable into and out of the cylinder body, the piston rod being coupled to the tension roller.

6. The center drive assembly of claim 1 wherein the belt path of the center drive assembly includes only the guide roller, the drive roller and the tension roller.

7. The center drive assembly of claim 1 wherein each of the side frame members includes a guide channel extending from the first end to the second end of each side frame member, wherein the pair of spaced side plates are each mounted to the guide channel in one of the side frame members such that the side plates can be mounted anywhere along the entire length of the frame assembly.

8. The center drive assembly of claim 1 wherein the guide roller assembly includes a pivot bracket pivotally mounted between the pair of spaced side plates and a guide roller rotatably mounted to the pivot bracket.

9. The center drive assembly of claim 1 further comprising:

a slot formed in each of the spaced side plates to receive one end of the tension roller such that the tension roller is movable along the pair of spaced slots to modify the belt path; and a pair of tensioning cylinders each coupled to one end of the tension roller and mounted to one of the spaced side plates, wherein operation of the tensioning cylinder moves the tension roller along the pair of spaced slots to adjust the tension in the conveyor belt.

10. The center drive assembly of claim 9 wherein each of the tensioning cylinders includes a piston rod movable into and out of a cylinder body, wherein each piston rod is coupled to one end of the tension roller by a mounting block secured to the piston rod.

11. The center drive assembly of claim 10 further comprising a collar positioned between the mounting block and the side plate to prevent the lateral movement of the tension roller between the pair of spaced side plates, wherein the collar can be released to allow the lateral movement of the tension roller relative to the spaced side plates.

12. A center drive assembly for a conveyor having a frame assembly extending from a first end to a second end and including a pair of spaced side frame members, the center drive assembly comprising:

a pair of spaced side plates each configured for attachment to one of the side frame members between the first end and the second end of the frame assembly, each of the side plates extending below the side frame members;

a guide roller assembly pivotally mounted between the pair of spaced side plates, the guide roller assembly including a pivot bracket pivotally mounted between the pair of spaced side plates and a guide roller rotatably mounted between the pivot bracket, wherein the guide roller is pivotally movable between an operating position in which the conveyor belt passes over the guide roller assembly and a belt-changing position in which the guide roller is pivoted away from the side frame members;

a drive roller rotatably mounted between the pair of spaced side plates;

a drive motor mounted to one of the side plates and coupled to the drive roller to rotate the drive roller; and a tension roller extending between the spaced side plates, the tension roller being movable relative to the drive roller to modify the length of a belt path defined by only the guide roller, the drive roller and the tension roller.

13. The center drive assembly of claim 12 further comprising at least one tensioning cylinder coupled to the tension roller and mounted to one of the side plates, wherein operation of the tensioning cylinder moves the tension roller relative to the drive roller and the guide roller to modify the length of the belt path.

14. The center drive assembly of claim 12 further comprising:

a slot formed in each of the spaced side plates to receive one end of the tension roller such that the tension roller is movable along the pair of spaced slots to selectively modify the length of the belt path; and a pair of tensioning cylinders each coupled to one end of the tension roller and mounted to one of the spaced side plates, wherein operation of the tensioning cylinder moves the roller along the pair of spaced slots to modify the length of the belt path.

15. The center drive assembly of claim 12 further comprising a guard member mounted between the pair of spaced side plates and positioned to at least partially surround the drive roller, the guard member having a hook member that receives the pivot bracket of the guide roller assembly to limit the rotation of the guide roller assembly.

* * * * *